(12) United States Patent
Fackler et al.

(10) Patent No.: US 8,113,033 B2
(45) Date of Patent: Feb. 14, 2012

(54) METHOD TO CALIBRATE A FLOW BALANCE VALVE ON A WINDROWER DRAPER HEADER

(75) Inventors: Robert L. Fackler, Ephrata, PA (US); Timothy W. Rawlings, Jr., Manheim, PA (US)

(73) Assignee: CNH America LLC, New Holland, PA (US)

( * ) Notice: Subject to any disclaimer, the term of this patent is extended or adjusted under 35 U.S.C. 154(b) by 424 days.

(21) Appl. No.: 12/480,227

(22) Filed: Jun. 8, 2009

(65) Prior Publication Data

US 2010/0307219 A1 Dec. 9, 2010

(51) Int. Cl.
*G01F 25/00* (2006.01)

(52) U.S. Cl. .................. 73/1.16; 56/10.2 R; 56/10.2 G; 56/10.9; 60/443; 60/445; 701/36; 701/50

(58) Field of Classification Search ................... 73/1.16; 56/10.2 R, 10.2 G, 10.9; 60/443, 445; 701/36, 701/50

See application file for complete search history.

(56) References Cited

U.S. PATENT DOCUMENTS

| | | | |
|---|---|---|---|
| 2,718,759 A | | 9/1955 | Vestre |
| 4,337,611 A | * | 7/1982 | Mailander et al. ................. 460/7 |
| 4,481,770 A | | 11/1984 | Lohbauer et al. |
| 4,694,649 A | | 9/1987 | Howeth |
| 4,710,054 A | | 12/1987 | Allen |
| 4,869,491 A | | 9/1989 | Warnsholz et al. |
| 4,949,541 A | | 8/1990 | de Vietro |
| 5,040,126 A | | 8/1991 | Allington |
| 5,070,695 A | | 12/1991 | Metzner |
| 5,117,634 A | | 6/1992 | Marian et al. |
| 5,177,964 A | | 1/1993 | Tanaka et al. |
| 5,307,288 A | | 4/1994 | Haines |
| 5,659,485 A | | 8/1997 | Lee |
| 6,131,391 A | | 10/2000 | Poorman |
| 6,318,079 B1 | | 11/2001 | Barber |
| 6,330,525 B1 | | 12/2001 | Hays et al. |
| 6,546,724 B2 | | 4/2003 | Nishimura et al. |
| 6,848,254 B2 | | 2/2005 | Du |
| 6,922,991 B2 | | 8/2005 | Polcuch |
| 7,277,785 B2 | | 10/2007 | Strosser et al. |
| 7,398,144 B2 | * | 7/2008 | Strosser et al. ................. 701/50 |
| 7,483,780 B2 | | 1/2009 | Strosser et al. |
| 7,707,810 B2 | * | 5/2010 | Strosser et al. ............ 56/10.2 R |
| 2004/0177610 A1 | | 9/2004 | Hendrickson |
| 2006/0078435 A1 | | 4/2006 | Burza |

* cited by examiner

*Primary Examiner* — Hezron E Williams
*Assistant Examiner* — Rodney T Frank
(74) *Attorney, Agent, or Firm* — Patrick M. Sheldrake

(57) ABSTRACT

A simplified method for calibrating a variable-displacement hydraulic PTO system on an agricultural windrower when powering a header wherein the variable-displacement pump is operated at maximum flow capacity while the engine is operated at a pre-determined speed and a flow balance valve is adjusted to achieved a pre-determined cutterbar speed. Operation of the cutterbar at the pre-determined speed allows sufficient hydraulic fluid flow through the remaining parallel fluid circuit to power the remaining equipment, typically a reel, on the header. Controls for managing pump displacement and engine speed as well as indication of cutterbar speed are typically available on the windrower tractor thereby eliminating the need for additional diagnostic equipment and making the method suitable for use in the field.

7 Claims, 2 Drawing Sheets

METHOD TO CALIBRATE A FLOW BALANCE VALVE ON A WINDROWER DRAPER HEADER

BACKGROUND OF THE INVENTION

The present invention relates to agricultural windrowers and, more particularly, to a method for calibrating a draper header on a windrower.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Briefly, the arms comprise elements of a lift and flotation mechanism or mechanisms operable for setting a height of the header above the ground or other surface over which the windrower moves, the flotation permitting the header to ride lightly up and over rises in the terrain during field operation.

Headers are typically available in a variety of configurations. Common elements of different headers include cutters operable for severing crops from the field. One typical cutting mechanism is a sickle cutter which includes a row of knives which extend across the width of the header and which are powered to move reciprocally sidewardly relative to a sidewardly extending array of fixed knives or bars, thereby effecting a cutting action. A typical cutting speed for a sickle type cutter is about 1400 to 1800 strokes per minute. Additional driven elements of a header can include elements for conveying cut crop material, such as a system of draper belts configured and operable for conveying the cut crop material sidewardly toward the center of the header, or side of the header.

The cutters and draper belts can be commonly powered using a fluid drive, such as a fluid power takeoff (PTO). A pump driven by the engine of the tractor provides pressurized fluid to the PTO system. Fluid conduits, such as hoses, connect the PTO system with fluid motors of the fluid drive. The pump can be of fixed displacement, the pressurization and fluid flow being dependent upon pump speed and fluid conduit configuration. The pump can also be of variable displacement, the pressurization and direction of fluid flow, and thus the speed and direction of operation of the cutters and draper belts, being controlled by solenoids. Varying electrical current signals are utilized for operating the solenoids, for operating the header at the desired speed and in the desired direction, and the electrical current required for driving the header at a selected speed would need to be known, such that the controller controlling the solenoids can apply the correct current responsive to an operator command, or when conditions change, such as a change in speed of the engine driving the pump. As an example, if a particular current signal is applied to the solenoids for the engine operating at a given speed, and the engine speed is subsequently increased or decreased, the fluid flow generated by the pump will correspondingly change. If the fluid flow increases, the excess may be diverted to tank via a diverter or pressure relief valve and be subjected to undesirable heating. A tractor, and thus the PTO system, may be configured for use with any of a variety of different headers having different current level requirements for driving the cutters and drapers. Alternatively, a single header design may be used on a variety of different tractors, each potentially having different PTO system fluid flow characteristics.

Therefore, it would be desirable to have a method which enables calibrating a PTO system on tractors having variable displacement hydraulic systems with an operating speed for a given header using feedback systems typically existing on the tractor, thus avoiding the need for the inclusion of additional monitoring instruments that overcomes the above problems and limitations. Additional benefit would be realized by a method that enables calibration of a hydraulic PTO system in the field without requiring resources typically available only in a repair or maintenance shop.

SUMMARY OF THE INVENTION

What is disclosed is a method for calibrating a variable-displacement PTO hydraulic system using only cutterbar speed as a feedback variable thereby eliminating the need for additional instrumentation in order to perform the calibration. Accordingly, the present invention, in any of the embodiments described herein, may provide one or more of the following advantages:

It is an object of the present invention to provide a method to calibrate a variable-displacement PTO hydraulic system on a self-propelled windrower for use with a draper header using existing header monitoring apparatus.

It is a further object of the present invention to provide a method for calibrating a self-propelled windrower variable-displacement hydraulic system for use with a crop harvesting header using cutterbar speed as a feedback variable.

It is a further object of the present invention to provide a method for calibrating a variable-displacement hydraulic PTO system by adjusting flow control valve to obtain a desired balance between parallel flow circuits while using a flow-related indication from one of the flow circuits.

It is a further object of the present invention to provide a method for calibrating a variable-displacement hydraulic PTO for use with a draper header which may be used with fixed- or variable-displacement hydraulic PTO systems without the need for additional parameter monitoring instrumentation.

It is a still further object of the present invention to provide a method for calibrating a variable-displacement hydraulic PTO for use with a draper header without the need for flow valves or other diagnostic equipment.

It is a still further object of the present invention to provide a method for calibrating a variable-displacement hydraulic PTO that can be easily performed on a windrower using indicating devices typically present on the machine.

It is a still further object of the present invention to provide a method for calibrating a variable-displacement hydraulic PTO for use with a draper header on a windrower that is simple and effective to use.

These and other objects are achieved according to the instant invention by a simplified method for calibrating a variable-displacement hydraulic PTO system on an agricultural windrower when powering a header wherein a variable-displacement pump in the system is operated at maximum flow capacity while an engine is operated at a pre-determined speed and a flow balance valve is adjusted to achieved a pre-determined cutterbar speed. Operation of the cutterbar at the pre-determined speed allows sufficient hydraulic fluid flow through the remaining parallel fluid circuit to power the remaining equipment, typically a reel, on the header. Controls for managing pump displacement and engine speed as well as indication of cutterbar speed are typically available on the windrower tractor thereby eliminating the need for additional diagnostic equipment and making the method suitable for use in the field.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
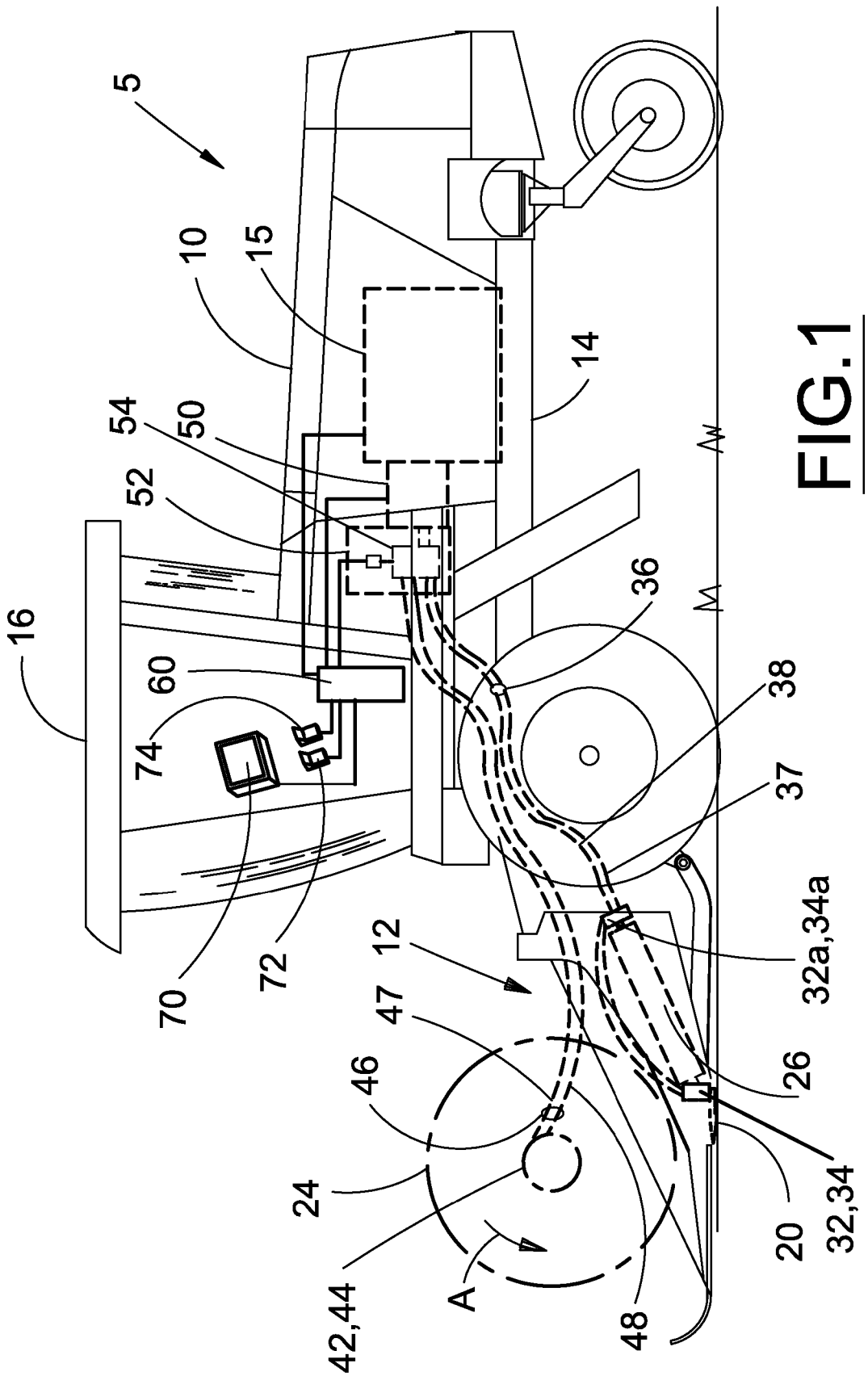
FIG. 1 is a side elevation view of a typical agricultural windrower fitted with a draper header of the type on which the present invention is useful.

In the illustrated embodiment shown in FIG. 1, the self-propelled windrower 5 comprises a tractor 10 and a header 12, the header 12 being attached to the front end of a frame 14 or chassis of the tractor 10. The header may be of generally any suitable construction and design, and will include crop-harvesting mechanisms, such as a sickle bar cutter 20. Header 12 additionally includes a reel 24 rotatable at a fixed or variable speed, as denoted by arrow A, for directing crops toward header 12 for harvesting by sickle bar cutter 20. A draper 26 comprising endless belts is disposed and operable for directing the harvested crop toward the center of header 12. There is an operator cab 16 where the operator controls the windrower operation. Motive power for the windrower 5 is provided by an engine 15, including power for pump 50 which is driven by engine 15, in the well known manner.

The general operation and construction of windrowers of the type on which the present invention may find utility can be found in U.S. Pat. No. 7,277,785, issued on Oct. 2, 2007, to Strosser et al., and U.S. Pat. No. 7,483,780, issued on Jan. 27, 2009 to Strosser et al., the descriptive portions of which are incorporated herein by reference.

Sickle bar cutter 20 of header 12 includes a row of knives extending sidewardly across the lower front of header 12 and reciprocally driven in the sideward direction, by at least one sickle drive 32 which preferably includes a sickle fluid motor 34. Sickle fluid motor 34 is connected in fluid communication with a first PTO 36 of tractor 10, by fluid lines 37 and 38, for receiving pressurized fluid therefrom, for powering the reciprocating movement of the sickle knives, in the well known manner. The first PTO 36 also typically provides motive power to the draper 26 via a draper drive 32a which includes a draper motor 34a. The sickle drive 32 is typically fluidly connected in series with the draper drive 32a.

Reel 24 is also fluid driven by a second PTO 46 connected to at least one reel drive 42, also preferably including a reel fluid motor 44. The reel fluid motor 44 is connected in fluid communication with the second PTO 46 of tractor 10, by fluid lines 47 and 48, for receiving pressurized fluid therefrom, for powering the rotational movement of the reel 24, in the well known manner.

A typical operating speed for sickle bar cutter 20, will be about 1400 cycles per minute. Because header 12 will be interchangeable on windrower 5 with other headers, and receive pressurized fluid from and are controlled by first and second PTOs 36, 46, as noted above, it is desirable to have a capability to adjust the output of the PTOs to optimize header performance, and provide a capability for adjusting to changing conditions, particularly changing engine speed.

Reel 24 can be driven at any speed within a range of from zero to about 55 rpm, and will typically be driven a speed between about 20 and 50 rpm. As with the sickle bar cutter 20, it is desirable to have the capability to adjust the speed of the reel to optimally suit harvesting conditions.

The sickle PTO and reel PTO are driven hydraulically by a pump 50 which is driven by engine 15 through a conventional driveline. Because pump 66 of PTO driveline is driven by engine 15, operation of the engine at different speeds will result in operation of pump 50 at different speeds. This will cause the pump 50 to generate different fluid flow outputs as the speed of the engine changes, if the displacement of the pump is not correspondingly adjusted for maintaining a particular fluid flow level. Pressurized fluid from pump 50 is directed toward a valve arrangement 52 where the individual PTO fluid circuits are established and controlled. When a header 12 is installed, if an amount of fluid flow from the PTO(s) in excess of that required for operating the header is generated, the excess flow will be directed through a diverter or pressure relief valve to a fluid supply tank.

Two common pump types are typically used in windrower PTO drives: fixed-displacement and variable-displacement. Fixed displacement pumps produce variations in flow in a fixed proportion to the pump (and hence engine) speed while the flow output of a variable-displacement pump may be altered independent of changes in pump speed. If an amount of fluid flow in excess of that required for operating the header 12 is generated by the pump 50, the excess flow will be directed through a diverter or pressure relief valve to a supply tank. This is inefficient, as the generation of the excess flow requires engine power, and the fluid is unnecessarily heated, thereby subjecting it and related componentry to heat related problems, which is undesirable. As a result, many windrowers employ variable-displacement pumps which allow the pump output flow to be adjusted to meet the required flow demand.

Draper headers typically include two parallel PTO hydraulic circuits: one for powering the sickle bar cutter and draper and another for powering the reel. Allocation of fluid flows between the two circuits is accomplished by a priority flow valve 54 which is selectively adjustable using controller 60 or other equivalent means to establish the desired flow rates in the circuits. Priority flow valve 54 may be housed in valve arrangement 52 where it may conveniently interface with controls on the tractor, as shown in FIG. 1. Alternatively, priority flow valve 54 may be remotely mounted, such as on header 12 where it is more likely to be manually adjusted. Once initially adjusted, further adjustment of the priority flow valve in not normally required during header operation. However, as the header may be used on more than one type tractor, adjustment is generally required for each unique tractor PTO system.

Calibrating the header flow circuits has become increasingly critical for proper header operation. The flow circuits must drive the sickle bar cutter at a desired speed while assuring sufficient flow in the parallel fluid circuit to drive the reel at its desired speed. The calibration process is further complicated by the practice of producing headers that may be used on tractors having fixed- or variable-diaplacement pumps in their PTO systems. Calibration adjustments typically require flow measuring devices and/or other diagnostic equipment to perform to replicate, to the extent practical, bench testing conditions in which flow rates are precisely monitored and controlled in order to optimally configure the hydraulic system. Such diagnostic equipment is not generally economically practical to provide on every tractor.

Figure 2:
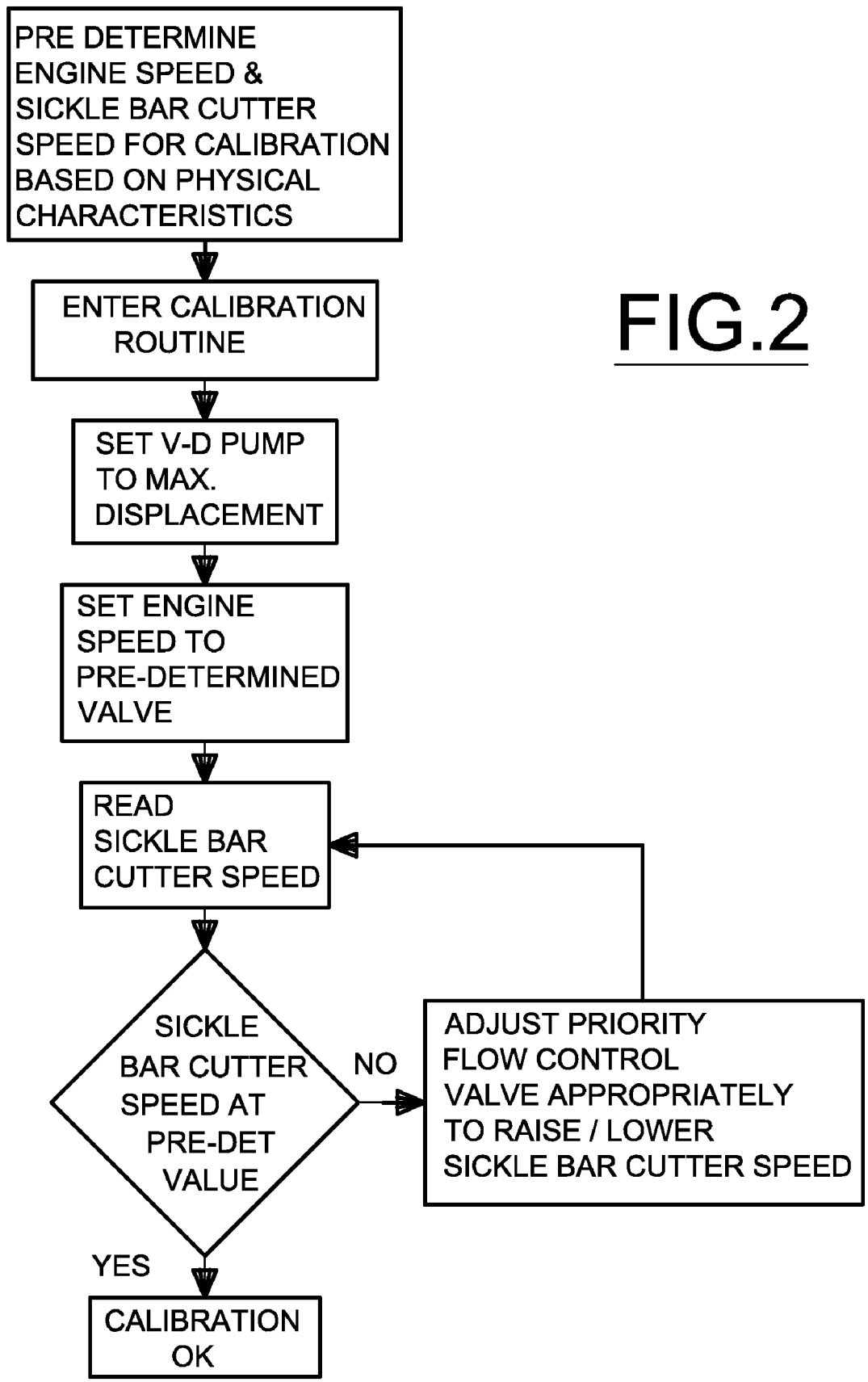
FIG. 2 is a diagrammatic presentation of the steps comprising one embodiment of the method of the present invention.

Now referring to FIG. 2 in conjunction with FIG. 1, a method for easily adjusting the priority flow valve 54 to calibrate the individual fluid circuit flows (PTO circuits 36, 46) in a windrower having a variable-displacement pump PTO system is shown. Operator interface controls in the cab 16 of the windrower typically include a control module 60, a display 70 and a plurality of input devices 72, 74 which allow the operator to initiate actions in the controller. Input devices 72, 74 may be discrete apparatus or may be implemented using touch-screen functions integrated into the display 70. Such controls are well-known in the art and not discussed in further detail herein. Minimally, controls allowing selective input of engine speed and pump displacement, a display for sickle bar cutter speed, and a means to selectively adjust the priority flow valve are necessary to implement the method described herein. Such controls and indication are typically available on windrower tractors of the type suitable for use with draper headers that are the subject of this invention.

The method of the present invention emulates a calibration routine typically performed using full diagnostic equipment. By setting several variable parameters to known values and relying on monitoring instrumentation typically installed on windrowers, adjustment using one key parameter (sickle bar speed) can be easily performed in the field. First, the pump 50 is operated to produce a known flow rate by establishing the pump displacement to its maximum value and adjusting the engine 15 speed to a pre-determined value that will produce the desired pump flow. The maximum flow setting on a variable-displacement pump 50 is chosen to minimize the affect of pump volumetric efficiency on the calculated flow rate. The specific value for the engine speed can be pre-determined based on the operating characteristics of the particular pump 50 used on the tractor (e.g., drive ratio between the engine and pump, pump displacement per revolution) and a target flow rate necessary for the calibration (typically derived from a fully instrumented test). These pre-determined values may be manually entered into a memory system within the controller 60 by an operator using the input devices 72, 74, or may be stored directly in memory, such as an EPROM included within the controller. Ideally, operation of the pump and engine are be directed by control system 60 so that their operation at pre-determined values occurs when the operator selects a calibration routine. Once a known PTO flow rate is established when engine speed and pump displacement setting reach the pre-determined values, the speed of the sickle bar cutter can be used to direct adjustment of priority flow valve 54 so that a pre-determined sickle bar cutter speed value is achieved. As above, the target or calibration cutter bar speed is calculated using the known flow rate and the proportional balance of flow rates between the sickle bar cutter and the reel drives and bench testing correlation of circuit flow rates to sickle or reel speed.

In one embodiment, calibration of the priority flow valve is ideally conducted with a flow of approximately 36 gallons per minute (gpm). Calibrating the valve requires adjusting the valve until 20.25 gpm is directed toward the sickle bar cutter drive with the balance of the flow being directed toward the reel drive. However, since circuit flow rates are typically not available, an indicator of sickle bar cutter speed is used. Providing a flow of 20.25 gpm to the sickle drive produces approximately 1,450 strokes per minute. Once calibration of the priority flow valve is completed, the pump may be operated at a nominal operational flow of 29 gpm which then directs 19.25 gpm to the sickle bar drive, producing a cutting speed of approximately 1,400 strokes per minute. Testing has shown that this simple calibration method is sufficient to calibrate the priority flow valve for proper sickle bar cutter and reel performance without the need for specialized instrumentation or diagnostic equipment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method for calibrating a hydraulic power takeoff powering a header on an agricultural windrower, the header having first and second parallel connected hydraulic drivers powered by the power takeoff, the method comprising the steps of:
   providing a tractor having an engine speed indicator and a pump powered by the engine for providing a flow of pressurized fluid to a power take off;
   providing a harvesting header connected to the tractor, the header having a cutterbar, a reel, the first driver, and the second driver, each driver receiving pressurized fluid flow from the power take off and connected in a parallel flow configuration, the first driver powering the cutterbar, the second driver powering the reel;
   providing a flow balance valve for receiving fluid flow from the power take off and apportioning fluid flow between the first driver and the second driver, the flow balance valve configured to enable selective adjustment of the ratio of fluid flow to the first and second drivers, respectively;
   providing a control system on the tractor for managing and monitoring engine speed and pump discharge flow, and monitoring cutterbar speed;
   determining a desired calibration flow rate from the power take off;
   determining, based on operating characteristics of the pump, a calibration pump speed that will produce the desired calibration flow rate;
   determining, based on power transfer characteristics from the engine to the pump, a calibration engine speed;
   determining, based on operating characteristics of the first and second drivers, the ratio of fluid flow between the first and second drivers;
   determining, based on operating characteristics of the cutterbar and the first driver, a cutterbar calibration speed;
   operating the windrower in a calibration mode;
   operating the engine at the calibration engine speed;
   observing the cutterbar speed; and
   adjusting the flow balance valve so that the indicated cutterbar speed is approximately equal to the cutterbar calibration speed.

2. The method of claim 1, wherein the cutterbar is a sickle bar cutter.

3. The method of claim 2, wherein the pump is a variable displacement pump selectively operable between a minimum flow and a maximum flow and further comprises the step of adjusting the pump to maximum flow.

4. The method of claim 3, wherein the header is a draper header having a draper powered by the power take off, and further wherein the first driver powers the sickle bar cutter and the draper.

5. The method of claim 4, wherein the pump speed and the engine speed are maintained at a constant ratio.

6. The method of claim 4, wherein the desired calibration flow rate is determined by comparison to a bench test result.

7. The method of claim 4, wherein the control system further comprises a memory apparatus for storing a plurality of values, wherein the plurality of values may include the desired calibration flow rate, the desired cutterbar speed, and/or the calibration engine speed.

* * * * *